United States Patent [19]

Takeuchi

[11] Patent Number: 4,492,141
[45] Date of Patent: Jan. 8, 1985

[54] SABER SAW BLADE

[76] Inventor: Eiji Takeuchi, 18-4 Jounancho, Sanjo-shi Niigataken, 951, Japan

[21] Appl. No.: 428,640

[22] Filed: Sep. 30, 1982

Related U.S. Application Data

[63] Continuation-in-part of Ser. No. 246,912, Mar. 23, 1981, abandoned.

[30] Foreign Application Priority Data

Dec. 15, 1980 [JP] Japan .................. 55-176702

[51] Int. Cl.³ ............................................. B27B 33/02
[52] U.S. Cl. ....................... 83/852; 83/835; 30/355
[58] Field of Search ............... 83/835, 846, 852, 854, 83/853, 855, 851; 30/355; 145/31 R

[56] References Cited

U.S. PATENT DOCUMENTS

| 408,669 | 8/1889 | Prescott | 30/355 X |
| 940,518 | 11/1909 | Dunn et al. | 83/852 X |
| 1,463,880 | 8/1923 | Evans | 83/852 |
| 2,682,098 | 6/1954 | Wilcox | 83/854 X |
| 4,265,285 | 5/1981 | Fodor | |

FOREIGN PATENT DOCUMENTS 148377 1/1937 Austria ..................... 83/852

Primary Examiner—James M. Meister
Attorney, Agent, or Firm—Parkhurst & Oliff

[57] ABSTRACT

The present invention relates to a saber saw which comprises a blade having a plurality of teeth. Each tooth has a cutting edge extending from a top to a deep recess and having an inclination angle of 90° to 120°. Each tooth also has a tooth face formed on its side opposite the first-mentioned cutting edge extending from the top to a shallow recess and having a releaf angle of 10° to 45°.

9 Claims, 4 Drawing Figures

SABER SAW BLADE

CROSS-REFERENCE

This is a continuation-in-part application filed Mar. 23, 1981, Ser. No. 246,912, now abandoned.

BACKGROUND OF THE INVENTION

1. Field of the Invention

This invention relates to saber saws and, more particularly, to a saber saw which can cut wood, banboo, vinyl chloride, etc. as it is pushed and also which can serve as a saw for cutting in parallel, perpendicular and oblique directions to the wood grain.

2. Prior Art

Japanese Patent Publication No. 3890/1960 discloses a hand saw, which has triangular cutting teeth faced alike on one side and also has sawdust discharge teeth provided for each tooth group consisting of several cutting teeth. Japanese Utility Model application Disclosure No. 128997/1978 discloses a universal saw, in which teeth having cutting edges for parallel cutting and teeth including two small upper teeth for perpendicular cutting are arranged as alternate groups consisting of an even number of, for instance two or four, teeth. In this reference each parallel cutting tooth group includes a central neutral tooth having the same shape as the parallel cutting tooth but extending upright without any inclination and having no cutting edge. Japanese Utility Model application Disclosure No. 160894/1978 discloses a saw, which has a plurality of teeth arranged to face alternately to the opposite sides and each having a perpendicular cutting edge formed on the side nearer the saw grip and having an inclination angle with respect to blade, and also in which the main portions of the teeth are raised sidewise.

These disclosed saws can cut wood as they are pulled relative thereto, and they can not cut anything when they are pushed.

Further, U.S. Pat. Nos. 940,518, 2,117,586, 2,890,728 and British Patent Specification Nos. 235,800, 426,498, 522,121, 648,449 disclose various saws. These saws, however, are not a saw provided in series with a main tooth portion having two faces for cutting in parallel, perpendicular and oblique directions to the wood grain.

SUMMARY OF THE INVENTION

An object of the invention is to provide a saber saw, which comprises a blade having a plurality of teeth, each tooth having a cutting edge extending from a top to a deep recess and having an inclination angle of 90° to 120°. Each tooth also has a tooth face which extends from a top to a shallow recess at a releaf angle in the range of 10° to 45°. An upper triangular face is formed on the top of the tooth.

BRIEF DESCRIPTION OF THE DRAWINGS

The above and further objects, features and advantages of the invention will become more apparent from the following description when the same is read with reference to the accompanying drawings, in which.

DETAILED DESCRIPTION OF THE PREFERRED EMBODIMENT

Now, the construction according to the invention will be described with reference to the drawings.

Figure 1:
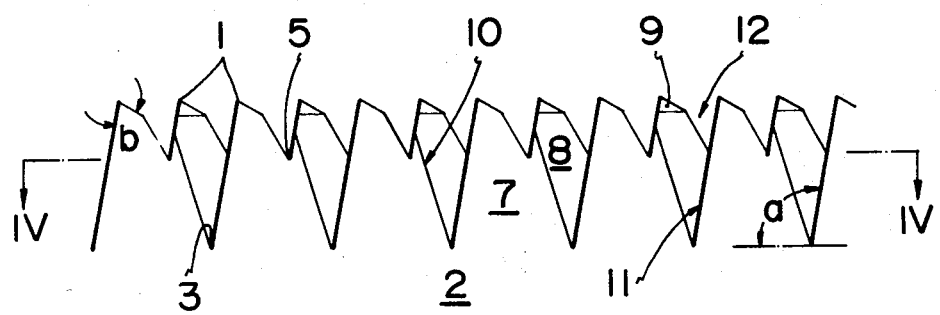
FIG. 1 is a fragmentary side view showing an embodiment of the saber saw according to the invention.
Figure 2:
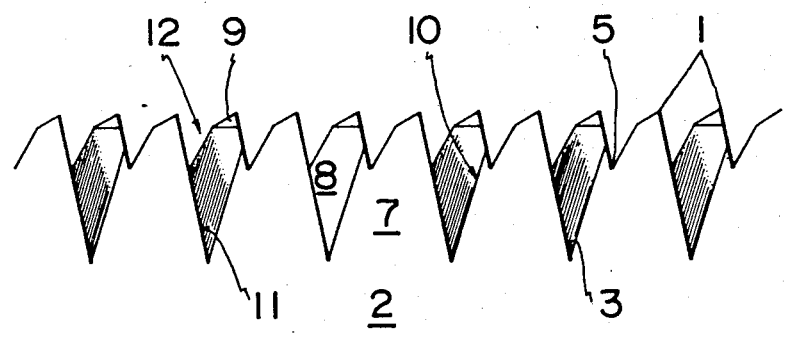
FIG. 2 is a fragmentary perspective view of the same saber saw showing as the rear of FIG. 1.

As shown in a fragmentary side view of FIG. 1 and in a fragmentary perspective view of FIG. 2 a blade comprises a shank 2 which has a plurality of teeth 7 which are alternately oppositely faced. Each tooth 7 has a tooth face 8 for perpendicular cutting to the wood grain and a cutting edge 11 for parallel cutting to the grain. The cutting edge 11 extends from a top 1 to a deep recess 3. Another cutting edge 10 is a boundary for the tooth face 8. The upper end of the tooth face 8 terminates in an upper triangular face 9. The releaf angle of the upper triangular face 9 at the top 1 is about 30° to 40°, preferably around 30°. The horizontal releaf angle of the upper triangular face 9 is 30° to 60°. The inclination angle a is desirable 90° to 120°, most desirably around 102°. The tooth top angle b is 40° to 70°, preferably around 55°.

The tooth faces 8 of the teeth 7, which serve as back faces and alternately face to the opposite sides, are set with a grindstone or a file. Each tooth face 8 extends from the top 1 to a shallow recess 5. As shown in a plan view of FIG. 3, the horizontal releaf angle c is desirably 0° to 15°, most desirably 3° to 4°.

Figure 3:
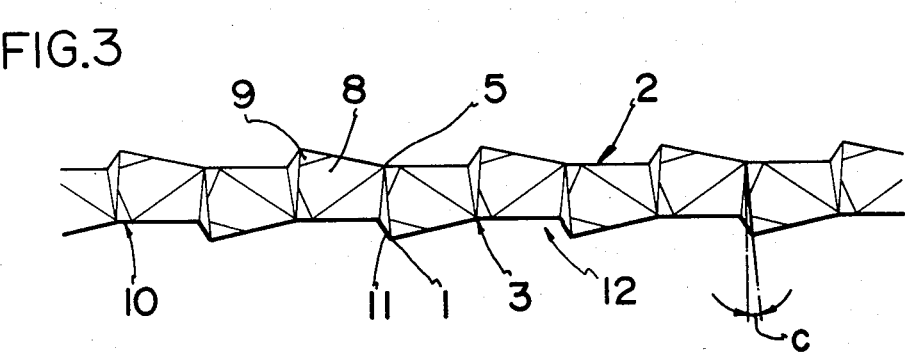
FIG. 3 is a plan view of the same saber saw.

As shown in FIG. 3, the tooth 7 is substantially trapezoidal in plan view, becoming narrower as one goes rearwardly.

As has been shown, according to the invention the cutting edges 11 of the teeth 7 constitute a saw for cutting in the parallel direction to wood grain, while the tooth faces 8 constitute a saw for cutting in the perpendicular direction to the grain. That is, the hand saw according to the invention can function excellently as a saw for cutting in the parallel direction, perpendicular direction and oblique direction with respect to the wood grain.

Figure 4:
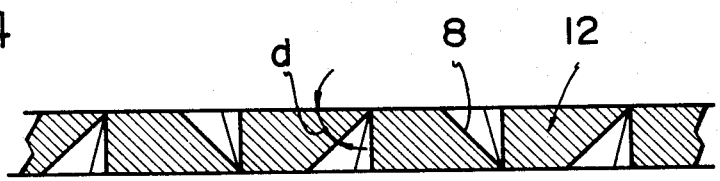
FIG. 4 is a sectional view taken along line IV—IV in FIG. 1.

The cutting angle a of the cutting edge 11 extending from the top 1 to the deep recess 3 is 90° to 120°, preferably 102°. The releaf angle d of the tooth face 8 extending from the top 1 to the shallow recess 5, which is indicated at d in FIG. 4, is 10° to 45°. As is clearly shown in FIG. 2, the main portions of the teeth 7 are raised sidewise alternately on the opposite sides.

With the construction described above according to the invention, the following effects can be obtained.

1. With the cutting inclination a set to 90° to 120°, the force applied when cutting wood will not be exerted to the entire main tooth portion 12 at a time.

More particularly, the cutting force is applied gradually from one end of the cutting edge 11 to the other end thereof. Thus, sharp cutting can be obtained with a very high cutting efficiency. Particularly superior results can be obtained when the cutting inclination is set to approximately 102°.

2. With the releaf angle d set to 10° to 45° as shown in FIG. 4, a large area of the tooth face 8 can be obtained, while the thickness of the main tooth portion 12 can be made small as a whole, so that sharp cutting effect can be obtained. Best results can be obtained by setting the releaf angle to approximately 25°.

3. The tooth face 8 for the perpendicular cutting and one cutting edge 11 for the parallel cutting are provided on each main tooth portion 12, so that the saw blade can be used for three different purposes, namely parallel cuttig, perpendicular cutting and oblique cutting to the wood grain.

4. With the inclination angle a set to 90° to 120°, wood can be cut along its grain with the cutting edges 11 set to extend along the fibers of the wood.

In the case of cutting perpendicular to the wood grain, the wood fibers are cut by the back faces constituted by the tooth faces 8 while driving out sawdust.

5. By the provision of the upper triangular face 9, the area of contact with wood when the saw is set to cut the wood is increased, which is desired from the standpoint of reliably cutting the wood.

6. With the horizontal releaf angle c set to 0° to 15°, preferably 3° to 45°, the tooth face 8 is thick, and the cutting angle a set to 90° to 120°, the teeth 7 are rigid as well as providing very satisfactory cutting effect.

7. Cutting test of the saw according to the invention reveals that the saw according to the invention is superior to the prior art saw by about 30% or above in the perpendicular cutting and about 100% or above in the parallel cutting.

What is claimed is:

1. A saber saw for cutting in parallel, perpendicular and oblique directions relative to a wood grain, the saber saw comprising:
   a blade having a plurality of teeth, said plurality of teeth being alternatively and oppositely faced to define alternating, shallow and deep recesses along a side of said blade;
   each tooth having a cutting edge, a tooth face and an upper triangular face on said tooth face;
   said cutting edge extending from a top of said tooth to a deep recess at an inclination angle in the range of 90° to 120°;
   said tooth face ectending from a top of said tooth to a shallow recess at a releaf angle in the range of 10° to 45°; and
   said upper triangular face being formed on the top of said tooth.

2. The saber saw as recited in claim 1, wherein the upper triangular face has a tooth angle that is larger than an angle between two cutting edges forming the tooth.

3. The saber saw as recited in claim 1, wherein the tooth face cuts perpendicularly to the wood grain.

4. The saber saw as recited in claim 1, wherein the cutting edge cuts parallel to the wood grain.

5. The saber saw as recited in claim 1, wherein the teeth have a substantially trapezoidal shape.

6. The saber saw as recited in claim 1, wherein the cutting edge is located at a front of the tooth and the tooth narrows in a rearward direction.

7. The saber saw as recited in claim 1, wherein the tooth face provides a surface for driving sawdust away from the tooth.

8. The saber saw as recited in claim 1, wherein the upper triangular face increases the area of contact between the tooth and wood.

9. The saber saw as recited in claim 1, wherein the inclination angle of the cutting edge reduces resistance to cutting.

* * * * *